United States Patent [19]

Männer

[11] Patent Number: 5,368,470
[45] Date of Patent: Nov. 29, 1994

[54] MULTIPLE PIN CLOSURE NOZZLE ASSEMBLY FOR INJECTION MOLDS

[76] Inventor: Otto Männer, Unter Gereuth 9, 79353 Bahlingen, Germany

[21] Appl. No.: 113,400

[22] Filed: Aug. 27, 1993

[51] Int. Cl.⁵ .............................................. B29C 45/23
[52] U.S. Cl. .................................. 425/564; 264/328.9; 425/566; 425/570
[58] Field of Search ............... 425/562, 563, 564, 565, 425/566, 570; 264/328.9

[56] References Cited

U.S. PATENT DOCUMENTS 5,066,216 11/1991 Kowtko et al. ..................... 425/562
5,078,589 1/1992 Osuna-Diaz ........................ 425/562

Primary Examiner—Tim Heitbrink
Attorney, Agent, or Firm—Darby & Darby

[57] ABSTRACT

A multiple closure pin nozzle assembly serves for the simultaneous charging of several individual molds in an injection molding mold and has two or more closure pins arranged in a common housing and driven by a common piston drive. Each closure pin closes a nozzle orifice arranged relative thereto and can be pulled back from this in order to allow the injection of molding material. In the region of the respective nozzle mouth, a heating device is arranged. In the common housing, feed channels are provided with branches which lead to the individual closure pins and their mouths. The common housing is split up below this common feed channel and its branches into separate housing portions connected with the common housing and each accommodating an individual closure pin and nozzle mouth. The housing portions have walls which run around the pins and interspaces between these walls to enable supports for the multiple nozzle assembly to be introduced below the common housing region between the housing portions.

13 Claims, 3 Drawing Sheets

MULTIPLE PIN CLOSURE NOZZLE ASSEMBLY FOR INJECTION MOLDS

FIELD OF THE INVENTION

The invention relates to a multiple pin closure nozzle assembly for injection molds with at least two closure pins arranged in a common housing and having a common piston drive, each of which closes a respective nozzle opening and which has, particularly in the region of the nozzle opening, heating means, wherein in the common housing, feed channels with branches to the individual closure pins are arranged in common.

Multiple pin closure nozzles are known in practice and serve in particular to enable relatively small parts to be molded in multiple injection molding molds in a narrow space in order that the multiple mold can be used as well as possible. The individual openings of the multiple pin nozzles can be so closely arranged relative to one another because of their common drive and their arrangement in a common housing so that even small workpieces and their mold cavities can be arranged in the multiple mold correspondingly close to one another.

In previously known multiple nozzles, however, there is the disadvantage that, above all because of the strong temperature variations at the mouth region, the individual sealing rings undergo dimensional changes and can thereby be damaged as a consequence. This problem cannot be avoided by making these sealing rings larger because this would in turn lead to a greater reaction to thermal influences.

A further problem consists in the fact that these multiple nozzles can be supported against the injection pressure only insufficiently, since the injection pressure at the individual nozzle mouths acts simultaneously correspondingly strongly and fixing only respectively at the exterior periphery of the entire unit is possible. Support resulting only at the exterior sides of such multiple nozzles has in practice shown itself to be insufficient.

There is accordingly the problem of creating a multiple pin closure nozzle of the initially described type in which the heating up in the mouth region does not lead to damage and in which simultaneously good support is possible against the reaction forces resulting from injection molding.

GENERAL DESCRIPTION OF THE INVENTION

The solution of this complex problem consists in a multiple pin closure nozzle assembly with a common housing in which the common housing below the feed channel or its branching is divided into housing parts separate from one another and having the individual closure pins and their nozzle openings and where these housing parts in each case between their walls have an interspace and are connected with the common housing.

The housing parts, separate from one another in each case on the common housing, can accordingly, because of their spacing, undergo any thermal movements in the mouth region without this having any adverse influence or leading to damage.

In addition to all this, an appropriate embodiment of the invention is possible starting from this in that the distances or interspaces between the individual housing parts provided below the housing region with the common feed channels and their branching off can have such a size that in between them a support of the multiple nozzle assembly—with respect to the injection molding mold—can be fitted. Accordingly, the injection molding pressure can be taken up essentially better and more evenly with respect to the individual nozzle openings and closure pins, whereby an unnecessarily over-dimensioned construction can also be avoided.

The invention allows a further advantageous embodiment which in itself is worthy of protection with respect to the heating device at the nozzle mouth, which can consist in that at the individual nozzle openings of the housing parts separate from one another in each case its own heating device is arranged and each heating device or nozzle mouth can have its own temperature monitor or sensor for independent temperature control of each individual nozzle of the multiple pin closure nozzles. While in previous multiple nozzles common heating for all openings has been provided, by means of the arrangement provided in accordance with the invention, the individual nozzle openings can be regulated precisely to a requisite temperature. Simultaneously undesired temperature influences of the individual nozzle openings one relative to another are eliminated.

For a precise, synchronous and above all space saving drive of the closure pins, it is appropriate, if on the individual closure pins—of the respective multiple pin closure nozzle—in each case parallel piston rods of the common piston drive engage and in each case several pistons arranged coaxially one relative to another and arranged sequentially in the displacement direction are provided simultaneously acting on the closure pins. Thus, for a multiple pin closure nozzle assembly, a piston is provided which acts on several piston rods simultaneously namely for each pin closure nozzle and in the axial direction behind this piston, there is present at least one further piston in order to transfer a sufficiently large closure force to the closure pins.

In this connection, it is particularly appropriate if the drive pistons acting in common on the closure pins are fixed to common throughgoing piston rods and if the piston rods in each case pass through a floor of the cylinder chambers arranged coaxially one behind another in the forward direction corresponding to the individual pistons and are slidingly guided in the passage openings of the floor.

Thereby there arises for the individual piston rods of the multiple nozzle because of the use of several pistons and correspondingly several cylinders with floors the possibility of arranging one behind the other at least two or more slide guides. Since additionally several such throughgoing piston rods are provided parallel to one another and each is multiply guided in the fashion mentioned, sufficiently precise guidance occurs that twisting of the piston rods, and accordingly distortion of the pistons, is itself practically eliminated. Accordingly also the danger is avoided that a, for example, relatively small pressure of the pressure medium of, for example, 3, 4, 5 or 6 bar, could not suffice in order to apply the necessary closure force to all of the closure pins of the multiple nozzle assembly.

In this connection, the piston rods can have at least so many slide guides as coaxial drive pistons connected with it and cylinder chambers for these drive pistons arranged axially one behind the other. Particularly effective in this connection is if the piston rods are in each case constructed integrally. Thereby the piston rods can project with a part projecting from the piston lying furthest from the closure pins and the projecting part can be guided in the cylinder lid or closure of this most remote piston, whereby yet a further additional guide possibility arises.

To improve the closure force, it is possible because of the common piston rods and their good guidance that additionally to the first and the further drive pistons, at least a third drive piston is provided and is displaceable in a cylinder chamber arranged behind the remaining cylinder chambers and closed and sealed off in itself. This allows the diameter of the piston drive to be maintained relatively small so that it can remain restricted in terms of space requirements, which the common housing of the multiple nozzle assembly requires. Nevertheless, even with limited space, the necessary often substantial closure force can be applied in this fashion with sufficient certainty even if only a relatively small compressed air pressure of, for example, about 4 to 6 bars is available.

A particularly suitable embodiment of the invention, which simultaneously permits good fixing of the individual closure pins within the multiple nozzle, and thereby can use the precise guidance of the piston rods, can consist in that the end of the closure pin fits coaxially in an aperture or bore in the piston rod and is fixed positively but releasably therein. The closure pin can accordingly be held by the piston rod not only in the axial but also in the transverse direction.

In this connection, it is possible that the bore of the piston rod is continued until past the piston furthest removed from the pin and has a mouth directed outwardly from which also the end of the closure pin is accessible and the closure pin can be dismountable and pullable out via the bore in the piston rod. For this, the bore can be arranged in particular centrally and concentrically in the piston rod. This facilitates exchanging a damaged or worn closure pin in simple fashion and without disassembly of the entire multiple nozzle. Each individual closure pin of the multiple nozzle can be changed in this fashion independently of the others.

The bore passing through the piston rod for receipt of and for disassembly of the closure pin can have at its end remote from the closure pin an suitable closure, preferably a screw closure, particularly a screw serving as a closure, the end face of which directed inwardly can likewise form the axial stop for the end of the closure pin or for an intermediate body between closure and the end of the pin.

After removal of the screw, the pin or the intermediate body coupled therewith is accessible and can be pulled out with the pin in the axial direction.

Thereby the end of the closure pin or of the intermediate body can have a bore with under-cutting or a thread in which from outside via the bore of the piston rod, a tool fitting thereto or a thread puller can be installed whereby the closure pin together with the intermediate body if provided can be pulled out in the axial direction through the piston rod.

Thus, by means of the invention, there is the possibility of providing a multiple pin closure nozzle in which, in a narrow space, several closure pins can be driven with sufficient force even if only a relatively small pressure of pressure medium is available, wherein nevertheless in the sensitive mouth region, a reactive damage from heat expansion is eliminated and if desired an additional support is possible. In the mouth region, in practice there is also the advantage, which individual pin closure nozzles with one closure pin respectively also have, that each nozzle mouth is independent from the others and can also be controlled with respect to its temperature independent from the neighbouring nozzle mouth, although all mouths belong to a common multiple pin closure nozzle.

BRIEF DESCRIPTION OF THE DRAWINGS

In what follows, exemplary embodiments of the invention will be described with reference to the drawing and in more detail by way of illustration and not limitation. In the drawings, there is shown in partial schematic illustration.

In the subsequent description of two exemplary embodiments, matching parts or parts with matching functions even if they have a respectively moderated form, have matching reference numbers.

DESCRIPTION OF PREFERRED EMBODIMENTS

Figure 1:
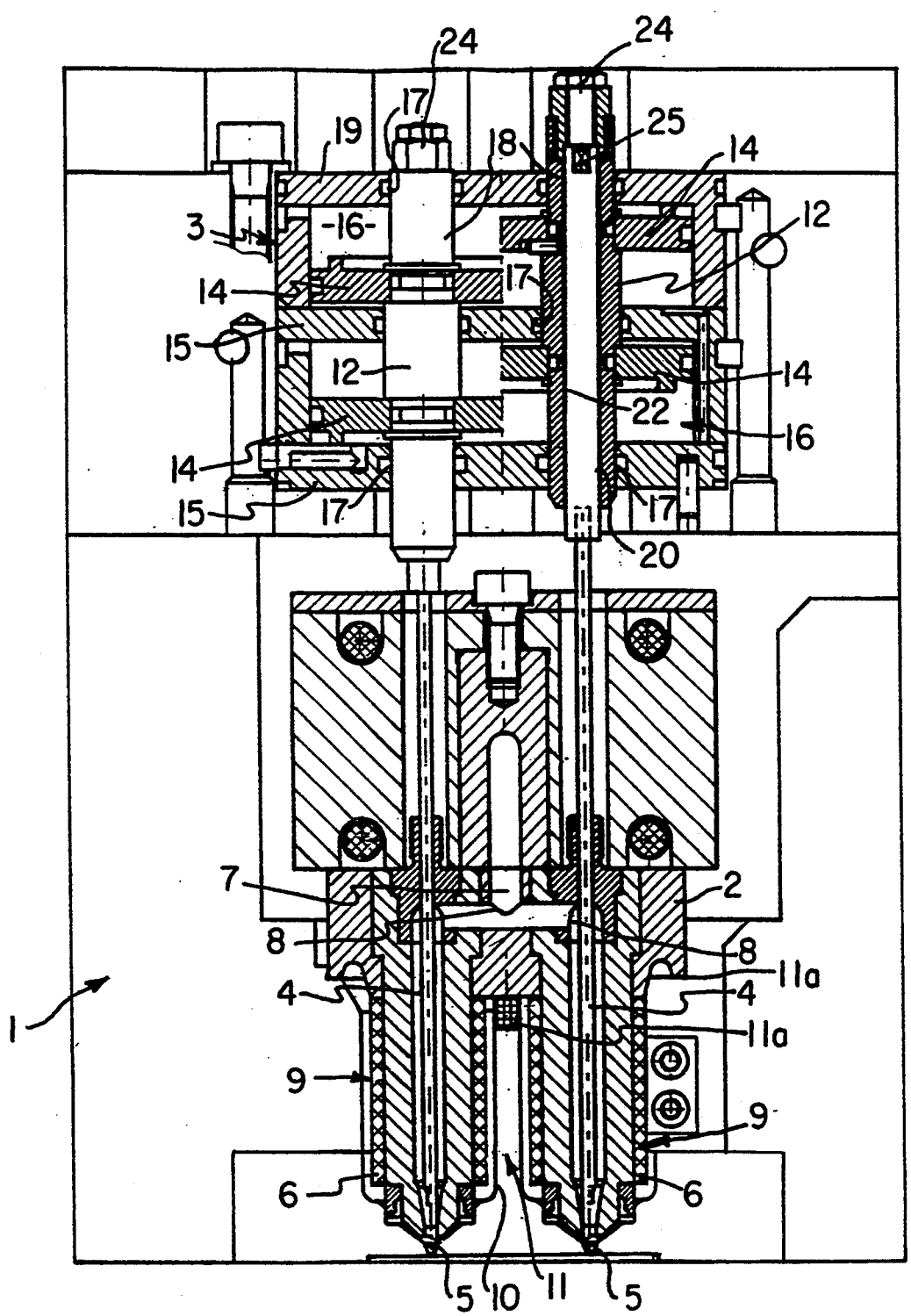
FIG. 1 a partial longitudinal section through a multiple pin closure nozzle with two closure pins and two nozzle openings in accordance with the Section lines A—A in FIG. 2.
Figure 2:
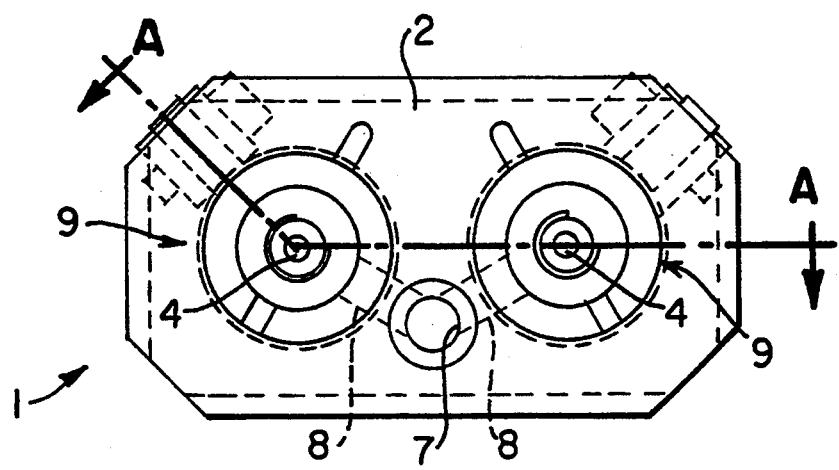
FIG. 2 is a plan view of a double pin closure nozzle without the piston drive.
Figure 4:
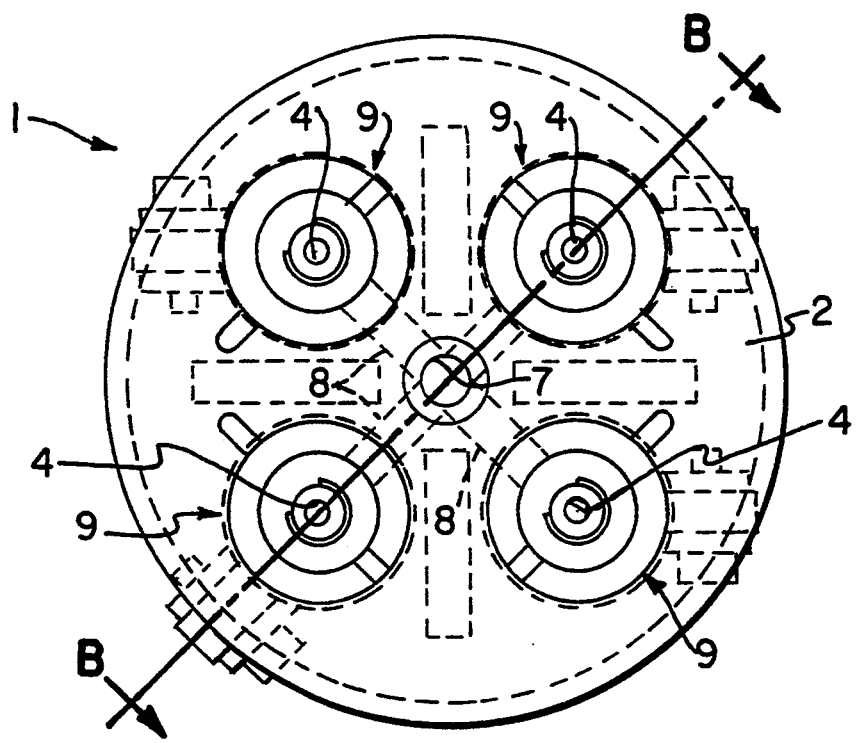
FIG. 4 is a plan view of the four-way pin closure nozzle in accordance with FIG. 3 without the piston drive.
Figure 3:
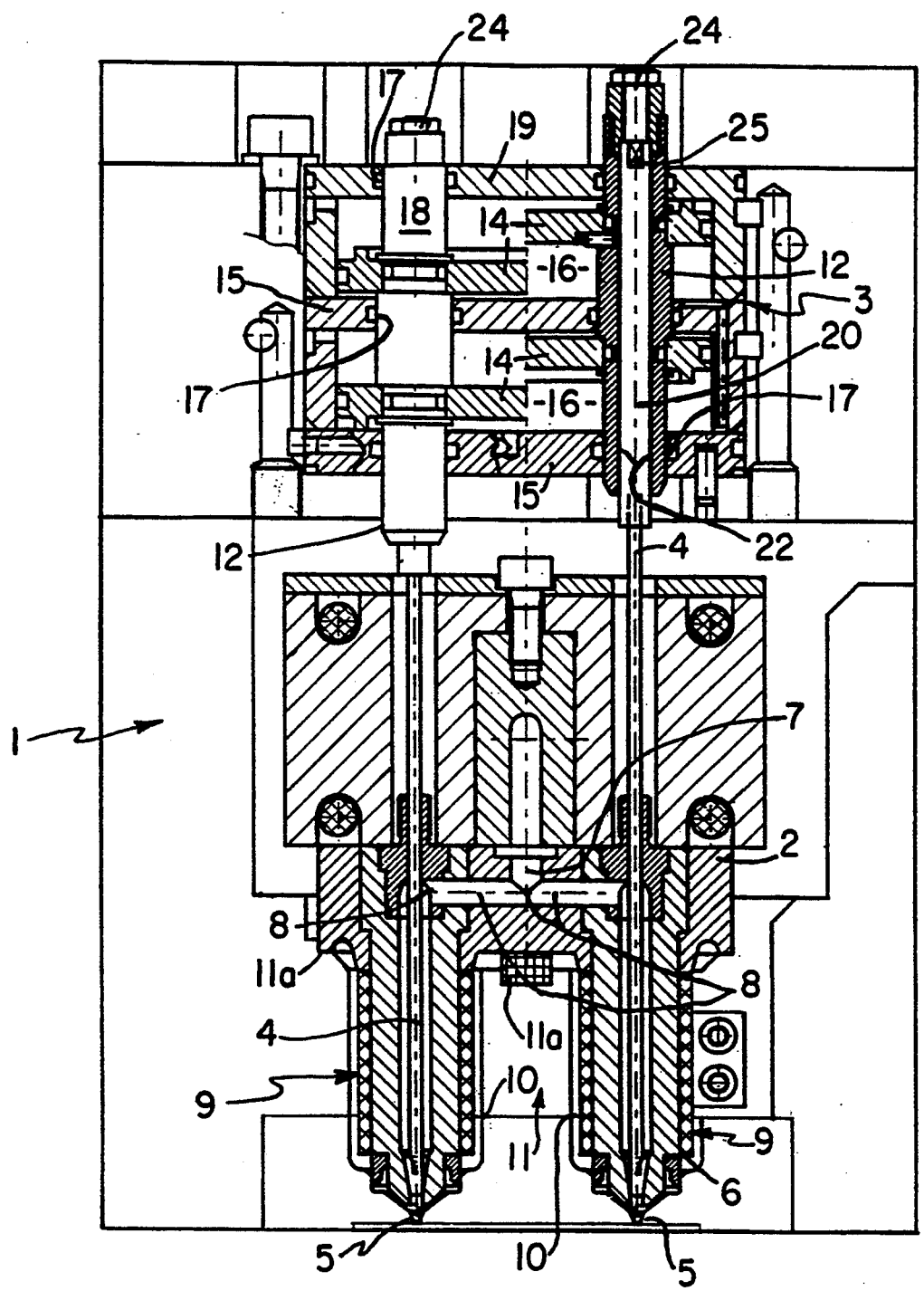
FIG. 3 is a section corresponding to FIG. 1 through a four-way pin closure nozzle according to Section lines B—B of FIG. 4.

A multiple pin closure nozzle assembly denoted as a whole by 1 for injection molding molds can, in accordance with FIGS. 1 and 2, contain two, and in accordance with FIGS. 3 and 4 four, closure pins 4 having a piston drive, denoted as a whole by 3, common to all of them and in a common housing 2.

Each closure pin 4 closes a nozzle mouth 5 arranged with respect to it and can be pulled back into the open position, when the injection molding material is to be filled in to the multiple mold. In this connection, in the region of the nozzle mouths 5, a heater 6 is arranged in each case.

In the common housing 2, there is evident a feed channel 7 with branches 8, from which the individual closure pins 4 and the nozzle mouths 5 can be supplied in each case with moldable material.

Clearly evident both in FIG. 1 and also in FIG. 3 is that the common housing 2 seen in a direction towards the nozzle openings 5 below the feed channels 7 and their branches or branch 8 is divided into housing portions 9 at a distance from one another and including the individual closure pins 4 and their nozzle openings 5, and that these housing portions 9 have in each case between their outer walls 10 an interspace 11 but are however connected to the common housing 2. The housing 2 achieves in this fashion an "udder like" form, wherein the nozzle mouths 5 are separated from one another by the intermediate space 11 in such a fashion that they can carry out thermal movements independently of one another and accordingly non-damagingly to one another.

In all the Figures, it is indicated that the distances of the individual housing portions 9 which are provided below the region of the housing with the common feed channels 7 and its branch 8 have such a size that between them supports 11a for the entire multiple nozzle assembly 1 fit. The spacial separation of the housing portions 9 belonging to the overall housing 2 in the region of the nozzle openings 5 and the greater part of the closure pins 4 thus allows a more stable support of the overall multiple nozzle assembly not just at its exterior periphery, but in regions lying closer to its centre.

The heating means 6 at the nozzle mouths 5 have already been mentioned. In FIGS. 1 and 3, it is clearly evident that at the individual nozzle mouths 5 of the housing portions 9 separate from one another in each case a respective heating device 6 is arranged, so that each heating device 6 or nozzle mouth 5 can have its own temperature monitor or sensor for independent temperature control of each individual nozzle of this multiple pin closure nozzle assembly. Correspondingly good injection molding results can be achieved with such a multiple nozzle assembly 1.

For the drive of the closure pins, there engage on the individual closure pins 4 in each case parallel piston rods 12 of the common piston drive denoted as a whole by 3, wherein in FIGS. 1 and 3, one can see two pistons arranged coaxially to one another and one behind the other in the movement direction, which, in each case, act simultaneously on the closure pins 4 of the multiple nozzle 1 and thus can be installed in a very space saving and compact fashion.

In order thereby that no adverse influence on the closure pins can result via the piston drive 3, if the closure pins 4, for example, are also loaded in the transverse direction by molding material flowing in, it is provided in both exemplary embodiments that the drive pistons 14 acting in common on the closure pins 4 are fixed to common overall throughgoing piston rods 12, and that the piston rods 12 pass through cylinder chambers 16, each having a floor 15 which contains the individual pistons 14 and arranged one behind the other coaxially in the forward direction and which are slidingly guided in the through passages 17 of the floor 15.

The piston rods 12 thus have at least as many sliding guides formed through the passage opening 17 as coaxial drive pistons 14 connected with it and cylinders 16 for these drive pistons 14 are arranged axially one behind the other. This leads to a very stable mounting and guiding of the piston rods 12, so that it does not twist even with transverse loading because of the closure pins 4 and pistons 14 are not distorted. In this connection, the piston rod 12 in the exemplary embodiments is constructed integrally.

From FIGS. 1 and 3, it is evident that the guiding and fixing of the piston rod 12 against lateral distortion twisting is yet further improved in that the piston red 12 of the piston lying furthest from the closure pin 4. projects with a projecting portion 18. The projecting portion 18 is guided in the cylinder lid or closure 19. Thus, there arises in this particular case even with two drive pistons 14 three sliding guides for the respective piston rod 12.

In both exemplary embodiments, a first and a second drive piston 14 is provided, but obviously at least a third drive piston could be provided and a further sealed off cylinder chamber behind the other cylinder chamber 16 could also be provided arranged displaceably and connected with the piston rod 12 in such cases where narrow space and having regard to a low pressure of the drive medium, a higher closure force would be necessary.

In FIGS. 1 and 3, it is further evident that the end of the closure pins 4 fits respectively via an intermediate body 20 coaxially into a cutout or bore 22 in the piston rod 12 and is fixed positively but releasably. Thereby forces arising transverse to the longitudinal closure pins 4 can be taken care of satisfactorily.

Furthermore, it is evident that the bore 22 in the piston rod 12 leads out until the piston 14 furthest removed from the pin 4 and has an outwardly directed opening from which the end of the closure pin 4 or the intermediate body 20 can be reached so that the closure pin 4 can be pulled out of the piston rod 12 through this bore 22 and can be disassembled. The bore 22 is thereby arranged centrally and concentrically in the piston rod 12 and filled up practically by the intermediate body 20 while the cross section of the closure pin 4 is somewhat smaller.

The bore 22 has at its end remote from the closure pin 4 a closure which in the exemplary embodiment is constructed as a screw 24 whose end face directed inwardly simultaneously constitutes the axial stop for the end of the closure pin 4 or of the intermediate body 20 between the closure and the pin end.

The end face of the intermediate body 20 turned towards the closure 24 has a threaded opening 25 for the screw 24 in which a tool matching thereto can be screwed in in order to pull out the intermediate body 20 with the closure pin 4 in the axial direction through the piston rod 8. The other way round, in this fashion a new closure pin 4 can be assembled again so that the exchange of individual closure pins 4 in the multiple nozzle assembly 1 is possible in the simplest fashion and without adverse influences.

The multiple pin closure nozzle assembly 1 according to the various exemplary embodiments serves for the simultaneous loading of several individual molds into an injection molding mold and has two or more closure pins 4 having a common piston drive 3 and arranged in a common housing 2. Each closure pin 4 closes, on the multiple nozzle assembly 1, a nozzle opening 5 arranged relative thereto and can be pulled back from this in order to allow the injection of molding material. In this connection, in the region of the respective nozzle opening 5, its own heating device 6 can be arranged. In the common housing 2, feed channels are provided with branches 8 which lead to the individual closure pins 4 and their openings 5. The common housing 2 is divided in this connection below this common feed channel 7 and its branches 8 into housing portions 9 separate from one another which at least partly receive the individual closure pins 4 and which have their nozzle openings 5. The division is, in this connection, so constructed spacially that these housing portions 9 have in each case between their walls running around the pins 4 an interspace 11 and which is connected, optionally, subsequently, with the common housing 2. Thus, below the common housing region between the housing portions 9, supports 11a for the multiple nozzle assembly can be introduced.

I claim:

1. A multiple pin closure nozzle assembly for use in an injection mold, said assembly having at least two closure pins arranged in a common housing and having a common piston drive connected to said at least two closure pins, each closure pin closing a respective nozzle opening in said common housing, heating means in the region of each nozzle opening for heating each nozzle opening, a feed channel arranged in the common housing with branches to the individual closure pins, each branch located in a housing portion connected to the common housing, each housing portion spaced from one another so as to form an interspace between outer walls of said housing portions and each having portion containing a corresponding one of said closure pins, each housing portion having at a tip thereof one of said nozzle openings.

2. The multiple pin closure nozzle assembly of claim 1 wherein said interspace is of such a size that a support for the assembly fits between the housing portions.

3. The multiple closure pin nozzle assembly of claim 1 wherein each nozzle opening is located adjacent to a corresponding said heating means and each of the nozzle openings is provided with a respective temperature monitor or sensor for independent temperature control of each individual nozzle of the multiple pin closure nozzle assembly.

4. The multiple closure pin nozzle assembly according to claim 1 wherein each closure pin has a corresponding parallel piston rod and said piston rods being connected to at least two common drive pistons arranged coaxially one behind the other in a displacement direction.

5. The multiple closure pin nozzle assembly of claim 4 wherein each piston rod passes through cylinder chambers each containing a floor and containing respective ones of said common pistons, said cylinder chambers being arranged one behind another, each piston rod being slidably guided through passage openings in the floor of each chamber.

6. The multiple closure pin nozzle assembly of claim 5 wherein the piston rod is constructed integrally.

7. The multiple closure pin nozzle assembly of claim 5 wherein each piston rod has a projecting portion which projects in a direction away from the corresponding closure pin past a drive piston most remote from the corresponding closure pin and is guided in a cylinder lid or closure.

8. The multiple closure pin nozzle assembly according to claim 4 and including an additional drive piston, the additional common drive piston being slidably arranged in a sealed cylinder chamber behind the at least two common drive pistons and connected to said piston rods.

9. The multiple closure pin nozzle assembly of claim 5 wherein each piston rod has a bore, and an intermediate body fitted coaxially in the bore of each piston rod, the closure pins having ends which are fixed positively but releasably to the intermediate bodies.

10. The multiple closure pin nozzle assembly of claim 9 wherein each bore extends up to a most remote end of the piston rod and has an outwardly directed orifice from which an end of the closure pin is accessible the closure pin being arranged to be pulled out and disassembled via the bore in the piston rod wherein the bore is arranged centrally and concentrically in the piston rod.

11. The multiple closure pin nozzle assembly of claim 10 wherein the bore passing through the piston rod for receiving and disassembling the closure pin and an intermediate body connected to the disclosure pin has a closure arranged to be applied against an end of the intermediate body remote from the closure pin, an inwardly directed end face of which simultaneously serves as an axial stop for an end of one of the closure pin and the intermediate body.

12. The multiple pin closure nozzle assembly of claim 11 wherein the end of one of the closure pin and the intermediate body has a bore with one of a cutout and thread in which through the bore in the piston rod one of a fitting tool and pulling bolt may be set whereby the closure pin, with the intermediate body, is arranged to be pulled out in an axial direction through the piston rod.

13. Multiple closure pin nozzle assembly according to claim 5 and including an additional drive piston, the additional drive piston being slidably arranged in a sealed cylinder chamber behind the at least two common drive pistons and connected to said piston rods.

* * * * *